(12) United States Patent
Tally et al.

(10) Patent No.: US 9,841,043 B2
(45) Date of Patent: Dec. 12, 2017

(54) CABLE TRAY SUPPORT

(71) Applicant: Cooper Technologies Company, Houston, TX (US)

(72) Inventors: Brandon Michael Tally, Greenville, IL (US); Stephen Nathaniel Thompson, Edwardsville, IL (US)

(73) Assignee: Cooper Technologies Company, Houston, TX (US)

( * ) Notice: Subject to any disclaimer, the term of this patent is extended or adjusted under 35 U.S.C. 154(b) by 56 days.

(21) Appl. No.: 14/485,337

(22) Filed: Sep. 12, 2014

(65) Prior Publication Data
US 2016/0076672 A1 Mar. 17, 2016

(51) Int. Cl.
| | | |
|---|---|---|
| B23P 11/00 | (2006.01) | |
| F16B 7/04 | (2006.01) | |
| H02G 3/00 | (2006.01) | |
| H02G 3/30 | (2006.01) | |
| F16L 3/11 | (2006.01) | |
| H02G 3/04 | (2006.01) | |

(52) U.S. Cl.
CPC ............. *F16B 7/0486* (2013.01); *H02G 3/26* (2013.01); *H02G 3/263* (2013.01); *H02G 3/30* (2013.01); *B23P 11/005* (2013.01); *F16L 3/11* (2013.01); *H02G 3/0456* (2013.01)

(58) Field of Classification Search
USPC ..... 248/200, 210, 58, 59, 61; 29/281.1, 259, 29/281.3, 281.4, 281.5; 411/539–540
See application file for complete search history.

(56) References Cited

U.S. PATENT DOCUMENTS

| | | | | |
|---|---|---|---|---|
| 3,960,350 | A * | 6/1976 | Tardoskegyi | F16L 3/14 248/589 |
| 5,102,074 | A * | 4/1992 | Okada | F16L 3/24 248/59 |
| 5,335,890 | A * | 8/1994 | Pryor | A47H 1/04 16/94 D |
| 5,580,014 | A | 12/1996 | Rinderer | |
| 7,946,540 | B2 * | 5/2011 | Drane | H02G 3/263 248/59 |
| 8,303,223 | B2 * | 11/2012 | Rass | F16B 37/045 248/58 |
| 8,602,365 | B2 | 12/2013 | Neace | |
| 9,458,952 | B2 * | 10/2016 | Zhang | F16M 13/027 |
| 2004/0049998 | A1 * | 3/2004 | Jette | H02G 3/285 52/220.1 |

OTHER PUBLICATIONS

Flextray™—Ceiling Support Methods, Center Trapeze Hanger, at least as early as Sep. 11, 2011, 1 page.

* cited by examiner

*Primary Examiner* — Alfred J Wujciak
(74) *Attorney, Agent, or Firm* — Senniger Powers LLP

(57) ABSTRACT

A cable tray support includes first and second rod openings each extending through one of first and second sides of a support body to allow first and second support rods to laterally enter the respective first and second openings. First and second lateral closure members are adjacent the respective first and second openings and are movable to closed positions to inhibit the respective first and second support rods, when received in the corresponding opening, from laterally exiting the corresponding opening.

18 Claims, 7 Drawing Sheets

CABLE TRAY SUPPORT

FIELD OF THE DISCLOSURE

The present disclosure generally relates to a cable tray support for supporting a cable tray in an elevated position.

BACKGROUND OF THE DISCLOSURE

Cable trays are used to support and house cables, wires, conduits and/or other components. The cable trays may be suspended from an elevated structure, such as ceiling, using a strut channel fastened to spaced apart threaded rods. Typically, upper fasteners, each comprising a washer and nut, are threaded on the lower ends of the rods, and then the threaded rods are inserted through openings or slots in one side of the strut channel. After the strut channel is received on the rods, lower fasteners, each comprising a washer and nut, are threaded on the lower ends of the rods such that the strut channel is between the upper and lower fasteners. While holding the strut channel above the lower fasteners, the lower fasteners are rotated on the threaded rods to move the lower fasteners to vertical positions generally corresponding to the desired vertical location of the strut channel. After positioning the lower fasteners, the upper fasteners are tightened on the rods to clamp the strut channel between the upper and lower fasteners.

The above process of positioning the strut channel on the rods in the desired vertical location and fastening the strut channel to the rods may be a cumbersome and time-consuming for the installer.

SUMMARY OF THE DISCLOSURE

In one aspect, a cable tray support generally comprises an elongate support body having opposite first and second longitudinal ends, a length extending between the first and second longitudinal ends, opposite first and second sides extending lengthwise, and opposite upper and lower surfaces. A first rod opening generally adjacent the first longitudinal end of the support body extends through the upper and lower surfaces. The first opening further extends through one of the first and second sides of the support body toward the other of the first and second sides to allow a first support rod to laterally enter the first opening. A second rod opening generally adjacent the second longitudinal end of the support body extends through the upper and lower surfaces. The second opening further extends through one of the first and second sides of the support body toward the other of the first and second sides to allow a second support rod to laterally enter the second opening. A first lateral closure member adjacent the first opening is movable to a closed position to inhibit the first support rod, when received in the first opening, from laterally exiting the first opening. A second lateral closure member adjacent the second opening is movable to a closed position to inhibit the second support rod, when received in the second opening, from laterally exiting the second opening.

In another aspect, a method of assembling a trapeze hanger system generally comprises providing a cable tray support. The cable tray support comprises an elongate support body having opposite first and second longitudinal ends, a length extending between the first and second longitudinal ends, opposite first and second sides extending lengthwise, and opposite upper and lower surfaces. A first rod opening generally adjacent the first longitudinal end of the support body extends through the upper and lower surfaces. The first opening further extends through one of the first and second sides of the support body toward the other of the first and second sides to allow a first support rod to laterally enter the first opening. A second rod opening generally adjacent the second longitudinal end of the support body extends through the upper and lower surfaces. The second opening further extends through one of the first and second sides of the support body toward the other of the first and second sides to allow a second support rod to laterally enter the second opening. A first lateral closure member adjacent the first opening is movable to a closed position to inhibit the first support rod, when received in the first opening, from laterally exiting the first opening. A second lateral closure member adjacent the second opening is movable to a closed position to inhibit the second support rod, when received in the second opening, from laterally exiting the second opening. The first support rod is inserted laterally into the first rod opening such that a length of the first support rod extends generally transverse to the length of the support body. The first lateral closure member is moved to the closed position to inhibit the first support rod from exiting the first opening in the lateral direction. The second support rod is inserted laterally into the second rod opening such that a length of the second support rod extends generally transverse to the length of the support body. The second lateral closure member is moved to the closed position to inhibit the second support rod from exiting the second opening in the lateral direction.

In another aspect, a method of making a cable tray support generally comprises providing sheet metal, and die-cutting the sheet metal to form: an elongate support body having opposite first and second longitudinal ends, a length extending between the first and second longitudinal ends, opposite first and second sides extending lengthwise, and opposite upper and lower surfaces; a first rod opening generally adjacent the first longitudinal end of the support body and extending through the upper and lower surfaces, the first opening further extending through one of the first and second sides of the support body toward the other of the first and second sides to allow a first support rod to laterally enter the first opening; a second rod opening generally adjacent the second longitudinal end of the support body and extending through the upper and lower surfaces, the second opening further extending through one of the first and second sides of the support body toward the other of the first and second sides to allow a second support rod to laterally enter the second opening; a first lateral closure member adjacent the first opening, the first lateral closure member being movable to a closed position to inhibit the first support rod, when received in the first opening, from laterally exiting the first opening; and a second lateral closure member adjacent the second opening, the second lateral closure member being movable to a closed position to inhibit the second support rod, when received in the second opening, from laterally exiting the second opening.

Other aspects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DISCLOSURE

Figure 1:
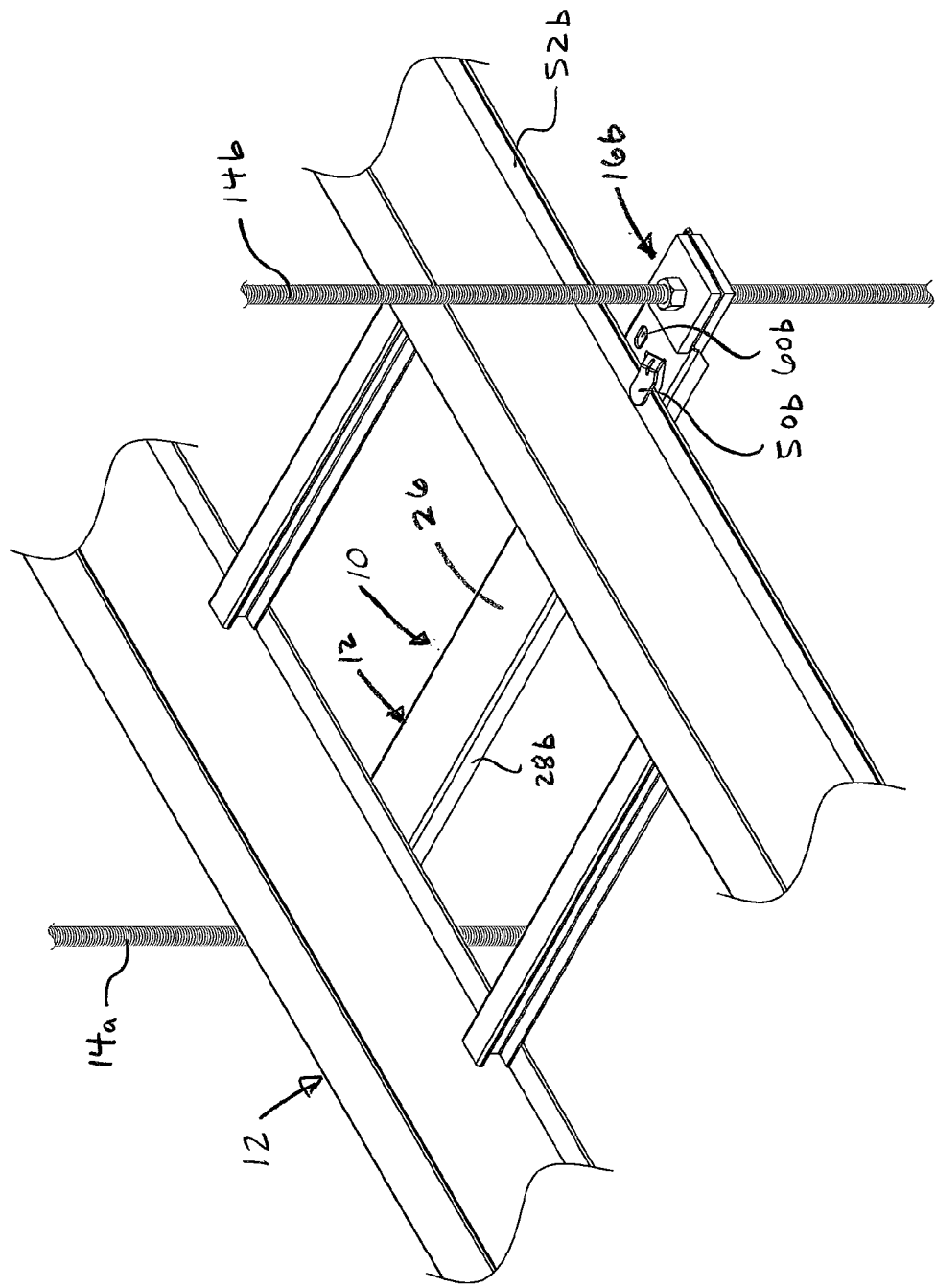
FIG. 1 is a right side perspective of a trapeze hanger system supporting a cable tray in an elevated position, the trapeze hanger system including a cable tray support.
Figure 2:
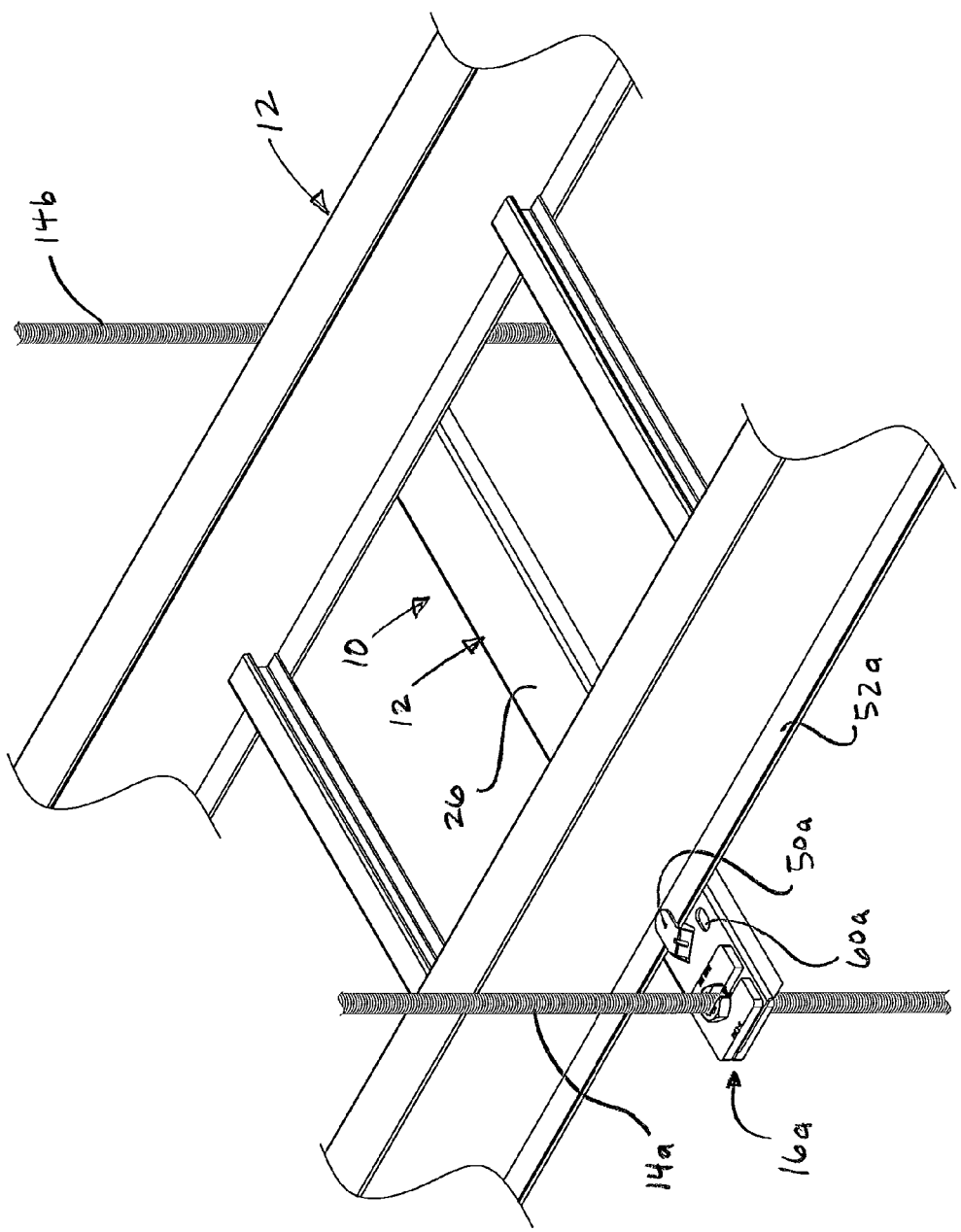
FIG. 2 is a left side perspective of FIG. 1.

Referring to FIGS. 1 and 2, a cable tray support is generally indicated at reference numeral 10. As shown in FIG. 1, the cable tray support 10 is adapted to support a cable tray, generally indicated at 12, in an elevated position. In particular, in the illustrated embodiment the cable tray support 10 is suspended from an elevated structure, such as ceiling or other structure, by fastening the cable tray support to first and second support rods 14a, 14b, respectively, depending from the elevated structure to form what is commonly called a trapeze hanger system. The support rods 14a, 14b may be threaded (e.g. all-thread rods), and first and second pairs of cable tray support fasteners, generally indicated at 16a, 16b, respectively, are secured to the respective first and second support rods 14a, 14b to fasten the cable tray support 10 to the rods. In a specific application, a plurality of cable tray supports 10 may be used to support a cable tray run, including a plurality of cable trays 12, in an elevated position. As is generally known in the art, the cable tray 12 is used to support a cables, wires, and/or conduits in an elevated position. The illustrated cable tray 12 is of the type typically referred to as a ladder-type cable tray, although the cable tray support 10 may be used with other types of cable trays.

Figure 3:
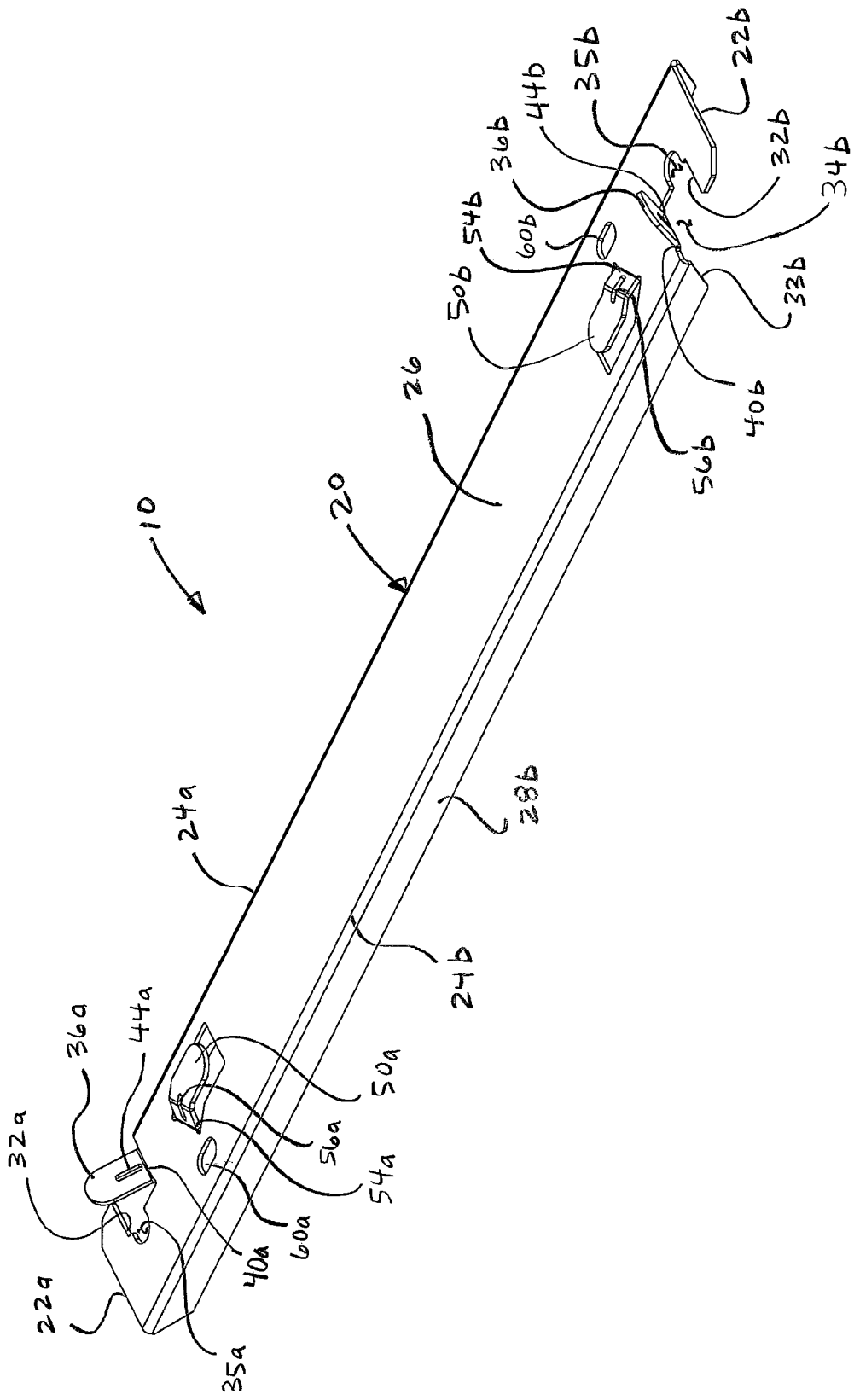
FIG. 3 is a left side perspective of the cable tray support.
Figure 4:
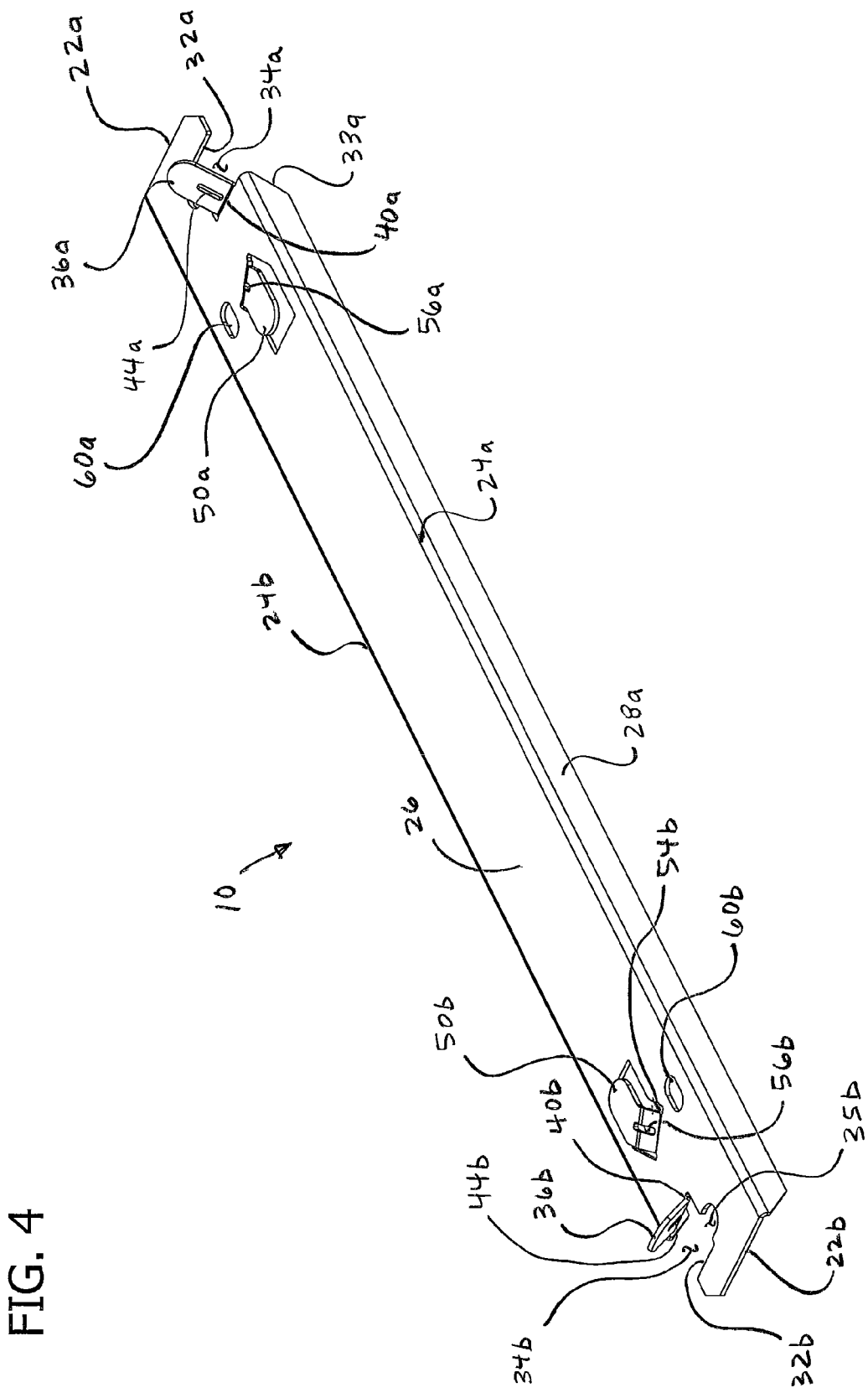
FIG. 4 is a right side perspective of FIG. 3.

Referring to FIGS. 3 and 4, the cable tray support 10 comprises an elongate support body, generally indicated at 20, having opposite first and second longitudinal ends 22a, 22b, respectively, and a length extending between the first and second longitudinal ends. Opposite first and second sides 24a, 24b, respectively, extend along the length of the support body 20, and a width extends between the opposite sides. The illustrated support body 20 has a generally planar upper surface 26—which functions as a support surface for the cable tray 12—and an opposite generally planar lower surface (not visible in the drawings). The illustrated support body 20 has a generally rectangular perimeter shape and is generally thin (e.g., 12-20 gauge, or 16 gauge in one example), although the support body may have other shapes and thickness without departing from the scope of the present invention. Because the support body 20 is generally thin, the cable tray support 10 includes first and second flanges 28a, 28b, respectively, extending downward from the respective first and second sides 24a, 24b and running along the length of the support body. The flanges 28a, 28b increase the rigidity of the support body 20 to increase the load that the support body can support without causing substantially bending (and failure) of the support body (i.e. the flanges increase flexural strength of the support body).

Referring still to FIGS. 2 and 3, first and second rod openings 32a, 32b, respectively, are formed in the support body 20 and extend through the upper surface 26 and the lower surface thereof. The first rod opening 32a is generally adjacent to the first longitudinal end 22a of the support body 20, and the second rod opening 32b is generally adjacent to the second longitudinal end 22b. The first rod opening 32a extends through the first side 24a toward the second side 24b of the support body, and the second rod opening 32b extends through the second side toward the first side, although the first rod opening 32a may extend through the second side toward the first side and/or the second rod opening may extend through the first side toward the second side. The first rod opening 32a is configured to allow the first rod 14a to laterally enter the first rod opening (e.g., enter through the first side 24a toward the second side 24b), and the second rod opening 32b is configured to allow the second rod 14b to laterally enter the second rod opening (e.g., enter through the second side 24b toward the first side 24a). Moreover, as shown in FIG. 4, the first flange 28a has a longitudinal end 33a terminating before the first rod opening 32a to allow the first support rod 14a to laterally enter the first rod opening 32a, and as shown in FIG. 3, the second flange 28b has a longitudinal end 33b terminating before the second rod opening 32b to allow the second support rod 14b to laterally enter the second rod opening. In the illustrated embodiment, each rod opening 32a, 32b has a rod-entry portion 34a, 34b extending through the corresponding one of the first and second sides 24a, 24b of the support body 20, and a rod-holding portion 35a, 35b in communication with the rod-entry portion and spaced inward from the corresponding one of the first and second sides of the support body. Each illustrated rod-holding portion 35a, 35b has a generally semi-circular perimeter and is sized to allow entry of the corresponding rod 14a, 14b therein. Each illustrated rod-entry portion 34a, 34b has a generally rectilinear perimeter for reasons which will be apparent from the below disclosure. The rod opening 32a, 32b may have other shapes and sizes without departing from the scope of the present invention.

The cable tray support 10 further comprises first and second lateral closure members 36a, 36b disposed on the support body 20. The first lateral closure member 36a is adjacent the first rod opening 32a, and the second lateral closure member 36b is adjacent the second rod opening 32b. The first and second closure members 36a, 36b are independently movable relative to the support body 20 to closed positions (shown in FIG. 6) to inhibit the respective support rods 14a, 14b from laterally exiting the corresponding rod openings 32a, 32b, more specifically the rod-holding portions 35a, 35b of the rod openings. In the illustrated embodiment, each lateral closure member 36a, 36b comprises a bendable tab that is connected to the support body 20 via a living hinge 40a, 40b. In particular, as shown in FIGS. 3 and 4, each lateral closure member 36a, 36b extends generally upward from the support body 20 in an open position to allow the corresponding one of the rods 14a, 14b to enter the corresponding rod opening 32a, 32b. Each of the lateral closure members 36a, 36b is movable (e.g., pivotable about the corresponding living hinge 40a, 40b and/or bendable along its length) toward the rod-entry portion 34a, 34b of the corresponding rod opening 32a, 32b to the closed position, in which the lateral closure member enters the rod-entry portion 34a, 34b and/or is generally transverse to the corresponding rod received in the rod opening to inhibit the rod from laterally exiting the corresponding rod opening. Each lateral closure member 36a, 36b has a tool slot 44a, 44b (broadly, a tool opening) extending therethrough for receiving a tool, such as a flat head screwdriver, to facilitate bending of the lateral closure member about the corresponding living hinge 40a, 40b and/or along its length. It is understood that the lateral closure members may be of other configurations for inhibiting lateral removal of the corresponding support rods from the rod openings without departing from the scope of the present invention.

In the illustrated embodiment, first and second cable tray clips 50a, 50b are disposed on the support body 20 for use in securing the cable tray 12 to the cable tray support 10, and/or positioning the cable tray 12 on the upper surface 26a of the support body, and/or inhibiting the cable tray from moving along the length of the support body. The first and second cable tray clips 50a, 50b are disposed generally adjacent the respective first and second longitudinal ends 22a, 22b of the support body 20 and longitudinally inward of the respective first and second rod openings 32a, 32b. As shown in FIGS. 1 and 2, the first and second cable tray clips 50a, 50b are independently movable relative to the support body 20 to engage respective first and second lower flanges 52a, 52b of the cable tray 12. In the illustrated embodiment, each cable tray clip 50a, 50b comprises a bendable tab that is connected to the support body 20 via a living hinge 54a, 54b. Each cable tray clip 50a, 50b has a tool slot 56a, 56b (broadly, a tool opening) extending therethrough for receiving a tool, such as a flat head screwdriver, to facilitate bending of the cable tray clip about the corresponding living hinge 54a, 54b and/or along the length of the cable tray clip. It is understood that the cable tray clips 50a, 50b may be other configurations or may be omitted from the cable tray support 10 without departing from the scope of the present invention.

First and second hold-down openings 60a, 60b extend through the upper surface 26a and the lower surface of the support body 20 for receiving respective first and second hold-down clamps (not shown). Hold-down clamps for securing cable trays to cable tray supports are generally known in the art and are not discussed in detail herein. The first and second hold-down openings 60a, 60b are disposed generally adjacent the respective first and second longitudinal ends 22a, 22b of the support body 20 and longitudinally inward of the respective first and second rod openings 32a, 32b. In particular, the first and second hold-down openings 60a, 60b are adjacent the respective first and second cable tray clips 50a, 50b. The hold-down clamps are optionally used to more permanently and more securely secure the cable tray 12 to the support body 20, as compared to the cable tray clips 50a, 50b. It is understood that the hold-down openings 26a, 26b may be other configurations or may be omitted from the cable tray support 10 without departing from the scope of the present invention.

Figure 5:
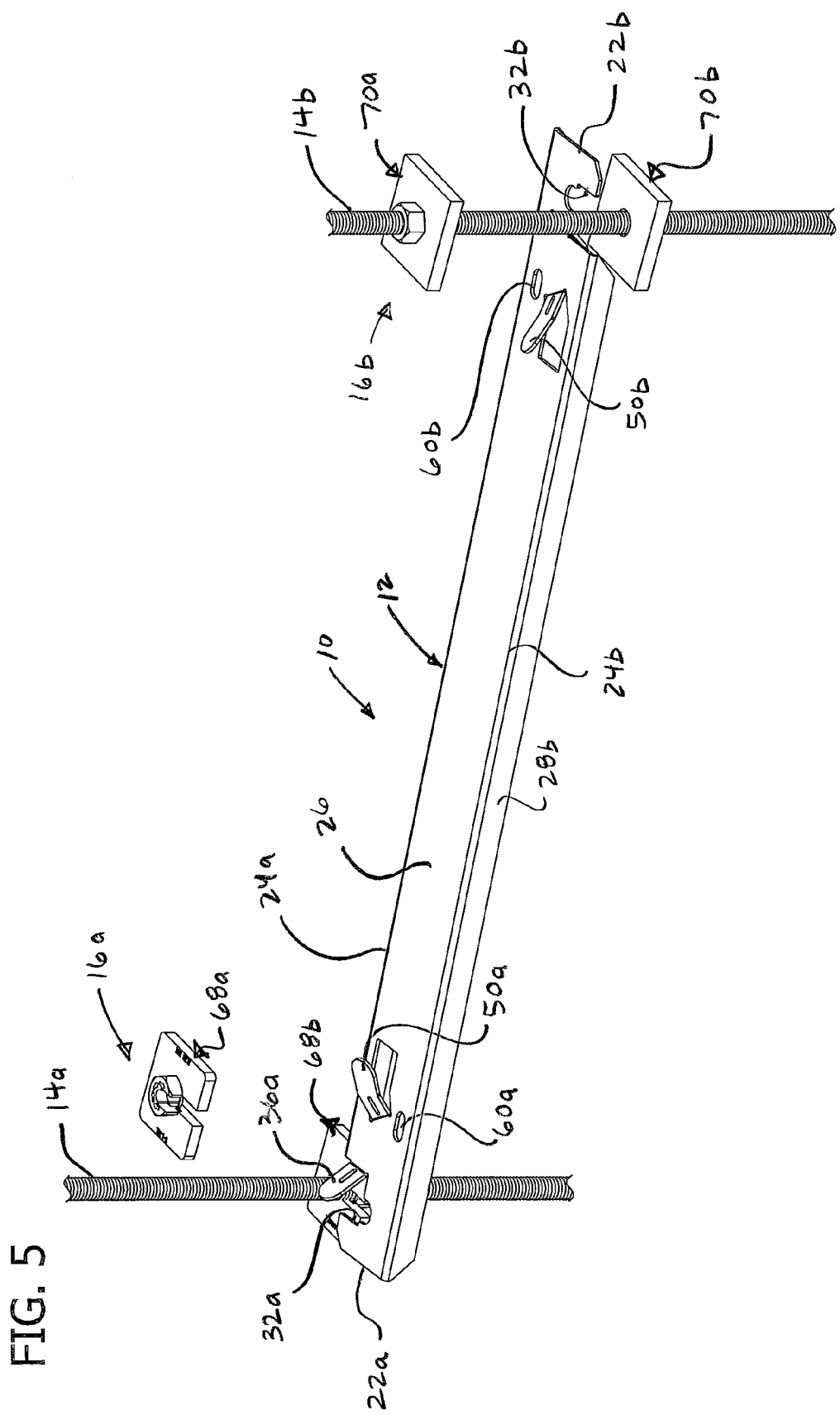
FIG. 5 is a perspective of the cable tray support being received on spaced apart support rods of the trapeze hanger system.
Figure 6:
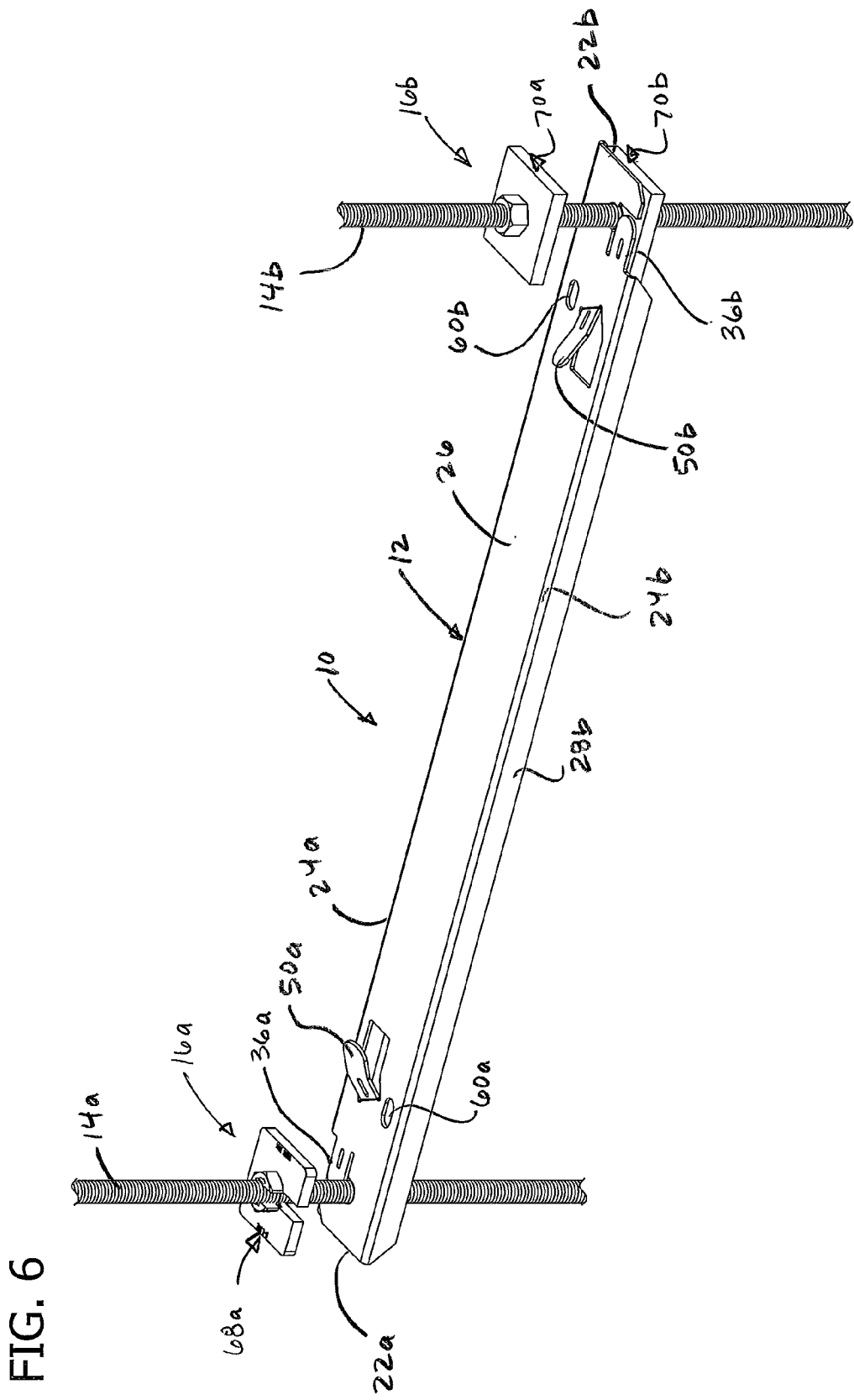
FIG. 6 is a perspective of the cable tray support received on the support rods.

As shown in FIGS. 1 and 2, the cable tray support 10 may be part of the trapeze hanger system for supporting the cable tray 12. Referring to FIG. 5, as a non-limiting example, to assemble the trapeze hanger system, the first and second support rods 14a, 14b—which depend from the elevated structure and are spaced apart from one another—are inserted laterally into the respective first and second rod openings 32a, 32b, and into the corresponding rod-holding portions 35a, 35b, such that the cable tray support 10 extends horizontally between the support rods and lengths of the support rods extend generally transverse to the length of the support body. In one embodiment, the cable tray support 10 is first orientated horizontally between the support rods 14a, 14b such that the length of the support body 20 extends generally transverse to the space extending between the first and second support rods. The cable tray support 10 is then rotated horizontally, as shown in FIG. 5, to move the first side 24a of the support body 20 toward the first support rod 14a, and the second side 24b of the support body toward the second support rod 14b. As shown in FIG. 6, the first and second support rods 14a, 14b enter the respective first and second rod openings 32a, 32b as the cable tray support 10 is rotated horizontally. It is understood that the support rods 14a, 14b may be inserted into the rod openings 32a, 32b in other ways, particularly in an embodiment where the rod openings are disposed on the same side of the cable tray support.

As shown in FIG. 6, after inserting the support rods 14a, 14b into the corresponding rod openings 32a, 32b (more specifically, into the corresponding rod-holding portions 35a, 35b), the first and second lateral closure members 36a, 36b may be moved to their closed positions to inhibit the first and second support rods from laterally exiting the respective first and second openings, as disclosed above. After this step, in one embodiment the cable tray support 10 may be movable up and down along the support rods 14a, 14b to allow adjustment of the vertical position of the cable tray support 10 on the rods. In another embodiment, the lateral closure members 36a, 36b, in their closed positions, may engage the support rods 14a, 14b (e.g., engage threads of the support rods) to inhibit the cable tray support 10 from moving up and down along the support rods.

Figure 7:
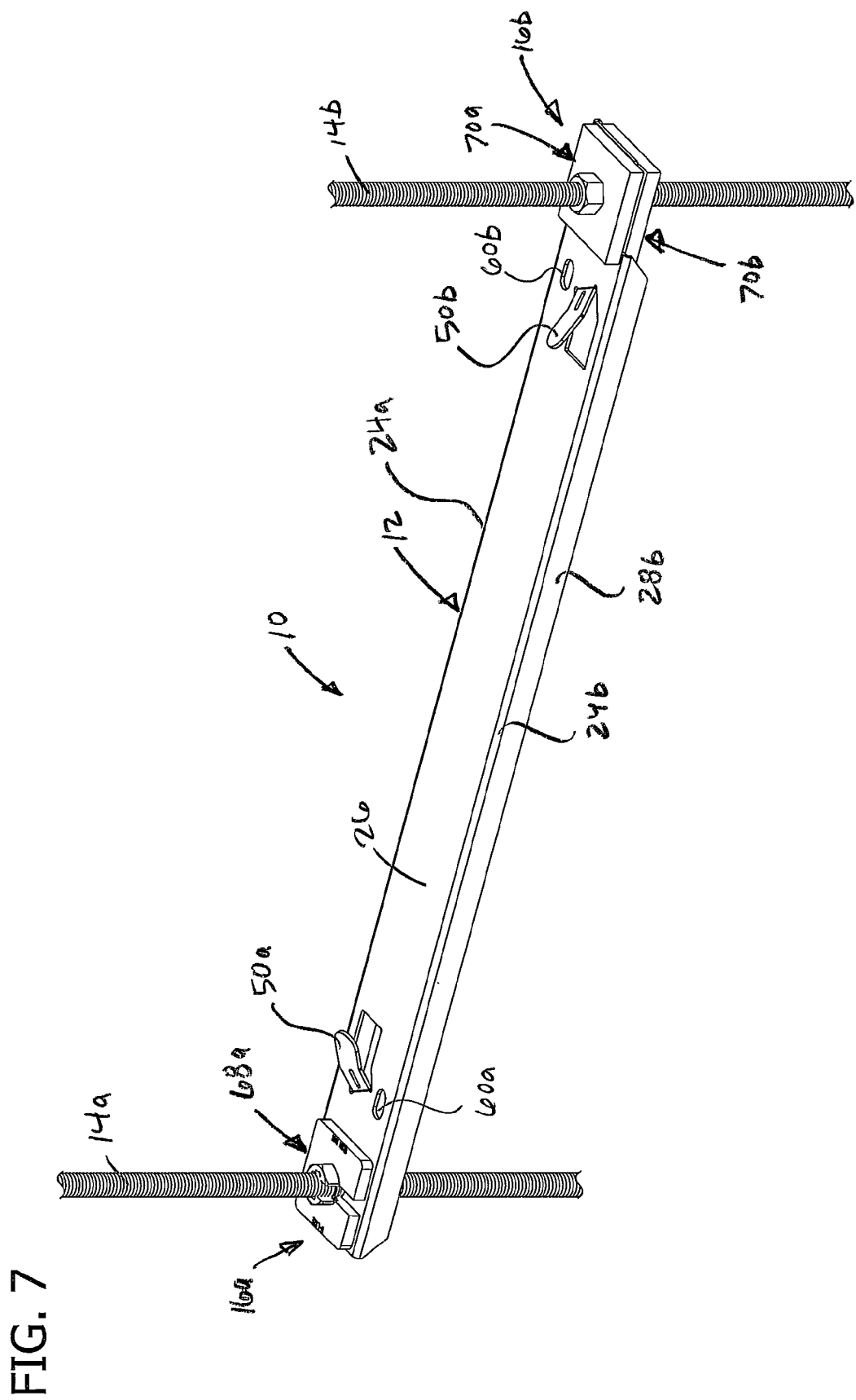
FIG. 7 is a perspective of the cable tray support fastened to the support rods.

After positioning the cable tray support 10 in the desired vertical position on the support rods 14a, 14b, the cable tray support may be fastened to the support rods using the first and second pairs of support fasteners 16a, 16b, as shown in FIG. 7. The first and second pairs of support fasteners 16a, 16b may include nut-washer combination fasteners received (e.g., threaded) on the support rods 14a, 14b. For illustrative purposes, as shown in FIG. 5, the first pair of support fasteners 16a comprises upper and lower slip-on lock nut washers 68a, 68b, respectively, sold by B-Line by Eaton as the BUZZNUT™ slip-on lock nut washer, and the second pair of support fasteners 16b comprises upper and lower standard nut-washer combination fasteners 70a, 70b, respectively. Other fasteners may be used. In one example, shown in FIG. 5, the lower support fasteners 68b, 70b may first be positioned on the respective support rods 14a, 14b in the general location of the desired position of the cable tray support 10. The cable tray support 10 may then be received on the support rods 14a, 14b, as set forth above, and supported by the lower support fasteners 68b, 70b. As shown in FIG. 7, with the cable tray support 10 in the desired position on the support rods 14a, 14b, the upper fasteners 68a, 70a (and optionally the lower fasteners 68b, 70b) can be tightened (e.g., threaded on the rods) to engage the support body 20 and capture the support body between the upper and lower support fasteners. The terminal ends 33a, 33b of the respective flanges 28a, 28b provide clearance for the installer to engage the lower fasteners 68b, 70b with a tool, such as a wrench. Other ways of fastening the cable tray support to the support rods do not depart from the scope of the present invention.

After (or before) fastening the cable tray support 10 to the support rods 14a, 14b, the cable tray 12 may be secured to the cable tray support. For example, the cable tray 12 may be placed on the upper surface 26a of the support body 20, and the first and second lower flanges 52a, 52b of the cable tray can be engaged by the respective first and second cable tray clips 50a, 50b, as shown in FIGS. 1 and 2. It is envisioned that in one embodiment the cable tray clips 50a, 50b may be optionally employed by the installer, such that as sold to the customer and/or delivered to the job site, the cable tray clips are provided in the downward position as shown in FIGS. 3 and 4 (e.g., the clips are generally parallel to or coplanar with the support body 20). In such an embodiment, to employ the cable tray clips 50a, 50b, the clips are bent to an upward position as shown in FIGS. 5-7, such as by using the tool inserted in the tool slots 56*a*, 56*b*, before placing the cable tray 10 on the upper surface 26*a* of the support body 20. The cable tray 12 is then placed on the upper surface 56*a* and the first and second cable tray clips 50*a*, 50*b* are pressed downward, such as by using the tool, to engage the respective first and second flanges 52*a*, 52*b* of the cable tray 10, as shown in FIGS. 1 and 2. Hold-down clamps (not shown) may be optionally fastened to the cable tray support 10 using the hold-down openings, 60*a*, 60*b* to securely fasten the cable tray 12 to the cable tray support.

In one embodiment, the cable tray support 10 may be made by known metal fabrication processes and techniques. For example, the cable tray support 10 may be fabricated from sheet metal (e.g., steel or aluminum sheet metal or other types of sheet metal). The gauge of the sheet metal, in one example, may be 14-20 gauge, or other gauges, and may depend on the type of metal. The cable tray 10 may be die-cut from the sheet metal in one or more die-cutting steps to form: the support body 10; the first and second rod openings 32*a*, 32*b*; the first and second lateral closure members 36*a*, 36*b* (the rod-entry portions 34*a*, 34*b* of the first and second rod openings 36*a*, 36*b* being at least partially formed during formation of the lateral closure members); the tool slots 44*a*, 44*b* in the lateral closure members; the cable tray clips 50*a*, 50*b*; the tool slots in the cable tray clips 56*a*, 56*b*; the hold-down openings 60*a*, 60*b*; and the terminal ends 33*a*, 33*b* of what will be the first and second flanges 28*a*, 28*b*. One or more forming steps, which may be performed after, before, or simultaneously with the one or more die-cutting steps, form the first and second flanges 28*a*, 28*b*. It is understood that the cable tray support 10 may be fabricated in other ways without departing from the scope of the present invention. Moreover, the cable tray support 10 may be made in other ways, besides being fabricated from sheet metal, without departing from the scope of the present invention.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable tray support comprising:
    an elongate support body having opposite first and second longitudinal ends, a length extending between the first and second longitudinal ends, opposite first and second sides extending lengthwise, and opposite upper and lower surfaces;
    a first rod opening generally adjacent the first longitudinal end of the support body and extending through the upper and lower surfaces, the first opening further extending through one of the first and second sides of the support body toward the other of the first and second sides to allow a first support rod to laterally enter the first opening;
    a second rod opening generally adjacent the second longitudinal end of the support body and extending through the upper and lower surfaces, the second opening further extending through one of the first and second sides of the support body toward the other of the first and second sides to allow a second support rod to laterally enter the second opening;
    a first lateral closure member adjacent the first opening, the first lateral closure member being movable to a closed position to inhibit the first support rod, when received in the first opening, from laterally exiting the first opening; and
    a second lateral closure member adjacent the second opening, the second lateral closure member being movable to a closed position to inhibit the second support rod, when received in the second opening, from laterally exiting the second opening,
    wherein the first and second lateral closure members are bendable relative to the support body to the respective closed positions, wherein the first and second lateral closure members are bendable about living hinges connecting the respective first and second lateral closure members to the support body.

2. The cable tray support set forth in claim 1, wherein each of the first and second lateral closure members comprises a tab extending outward from the support body.

3. The cable tray support set forth in claim 2, wherein each tab of the respective first and second lateral closure members has an opening therein for receiving a tool to facilitate bending of the tab about the living hinge.

4. The cable tray support set forth in claim 1, wherein each of the first and second lateral closure members are bendable to an open position to allow the respective first and second support rods to enter and exit the corresponding first and second openings.

5. The cable tray support set forth in claim 1, wherein the each of the first and second openings has a rod-entry portion extending through the corresponding one of the first and second sides of the support body, and a rod-holding portion in communication with the rod-entry portion and spaced inward from the corresponding one of the first and second sides of the support body.

6. The cable tray support set forth in claim 5, wherein each of the first and second lateral closure members is bendable toward the rod-entry portion of the corresponding one of the first and second openings to move the closure member to its closed position.

7. The cable tray support set forth in claim 1, wherein the first opening extends through the first side of the support body, and the second opening extends through the second side of the support body.

8. The cable tray support set forth in claim 7, further comprising a first flange extending downward from the first side of the support body, and a second flange extending downward from the second side of the support body.

9. The cable tray support set forth in claim 1, further comprising a first cable tray clip on the support body generally adjacent the first rod opening, and a second cable tray clip on the support body generally adjacent the second rod opening.

10. The cable tray support set forth in claim 9, wherein the first and second cable tray clips comprise bendable tabs extending outward from the upper surface of the support body.

11. The cable tray support set forth in claim 1, further comprising a first hold-down opening extending through the upper and lower surfaces of the support body generally adjacent the first rod opening for receiving a first hold-down clamp, and a second hold-down opening extending through the upper and lower surfaces of the support body generally adjacent the second rod opening for receiving a second hold-down clamp.

12. A method of assembling a trapeze hanger system comprising:
providing a cable tray support comprising:
an elongate support body having opposite first and second longitudinal ends, a length extending between the first and second longitudinal ends, opposite first and second sides extending lengthwise, and opposite upper and lower surfaces;
a first rod opening generally adjacent the first longitudinal end of the support body and extending through the upper and lower surfaces, the first opening further extending through one of the first and second sides of the support body toward the other of the first and second sides to allow a first support rod to laterally enter the first opening;
a second rod opening generally adjacent the second longitudinal end of the support body and extending through the upper and lower surfaces, the second opening further extending through one of the first and second sides of the support body toward the other of the first and second sides to allow a second support rod to laterally enter the second opening;
a first lateral closure member adjacent the first opening, the first lateral closure member being bendable relative to the support body to a closed position to inhibit the first support rod, when received in the first opening, from laterally exiting the first opening; and
a second lateral closure member adjacent the second opening, the second lateral closure member being bendable relative to the support body to a closed position to inhibit the second support rod, when received in the second opening, from laterally exiting the second opening, wherein the first and second lateral closure members are bendable about living hinges connecting the respective first and second lateral closure members to the support body;
inserting the first support rod laterally into the first rod opening such that a length of the first support rod extends generally transverse to the length of the support body;
bending the first lateral closure member to the closed position to inhibit the first support rod from exiting the first opening in the lateral direction;
inserting the second support rod laterally into the second rod opening such that a length of the second support rod extends generally transverse to the length of the support body; and
bending the second lateral closure member to the closed position to inhibit the second support rod from exiting the second opening in the lateral direction.

13. The method of assembling a trapeze hanger system set forth in claim 12, further comprising securing a cable tray on the upper surface of the support body using first and second clips on the support body.

14. The method of assembling a trapeze hanger system set forth in claim 12, further comprising securing the cable tray on the upper surface of the support body using first and second hold-down members fastened to the support body.

15. The method of assembling a trapeze hanger system set forth in claim 12, further comprising:
securing upper and lower fasteners to each of the first and second support rods; and
capturing the cable tray support between the upper and lower fasteners to secure the cable tray support to the first and second support rods.

16. A method of making a cable tray support comprising:
providing sheet metal;
die-cutting the sheet metal to form:
an elongate support body having opposite first and second longitudinal ends, a length extending between the first and second longitudinal ends, opposite first and second sides extending lengthwise, and opposite upper and lower surfaces;
a first rod opening generally adjacent the first longitudinal end of the support body and extending through the upper and lower surfaces, the first opening further extending through one of the first and second sides of the support body toward the other of the first and second sides to allow a first support rod to laterally enter the first opening;
a second rod opening generally adjacent the second longitudinal end of the support body and extending through the upper and lower surfaces, the second opening further extending through one of the first and second sides of the support body toward the other of the first and second sides to allow a second support rod to laterally enter the second opening;
a first lateral closure member adjacent the first opening, the first lateral closure member being bendable relative to the support body to a closed position to inhibit the first support rod, when received in the first opening, from laterally exiting the first opening; and
a second lateral closure member adjacent the second opening, the second lateral closure member being bendable relative to the support body to a closed position to inhibit the second support rod, when received in the second opening, from laterally exiting the second opening, wherein the first and second lateral closure members are bendable about living hinges connecting the respective first and second lateral closure members to the support body.

17. The method of making a cable tray support set forth in claim 16, wherein said die-cutting the sheet metal further forms a first cable tray clip on the support body generally adjacent the first rod opening, and a second cable tray clip on the support body generally adjacent the second rod opening.

18. The method of making a cable tray support set forth in claim 17, further comprising forming the sheet metal to form a first flange extending downward from the first side of the support body, and a second flange extending downward from the second side of the support body.

* * * * *